Aug. 17, 1965     E. C. PORTERFIELD     3,200,643
DRUM TYPE METER

Filed July 17, 1961                                           4 Sheets-Sheet 1

Ernest C. Porterfield
INVENTOR.

BY
ATTORNEYS

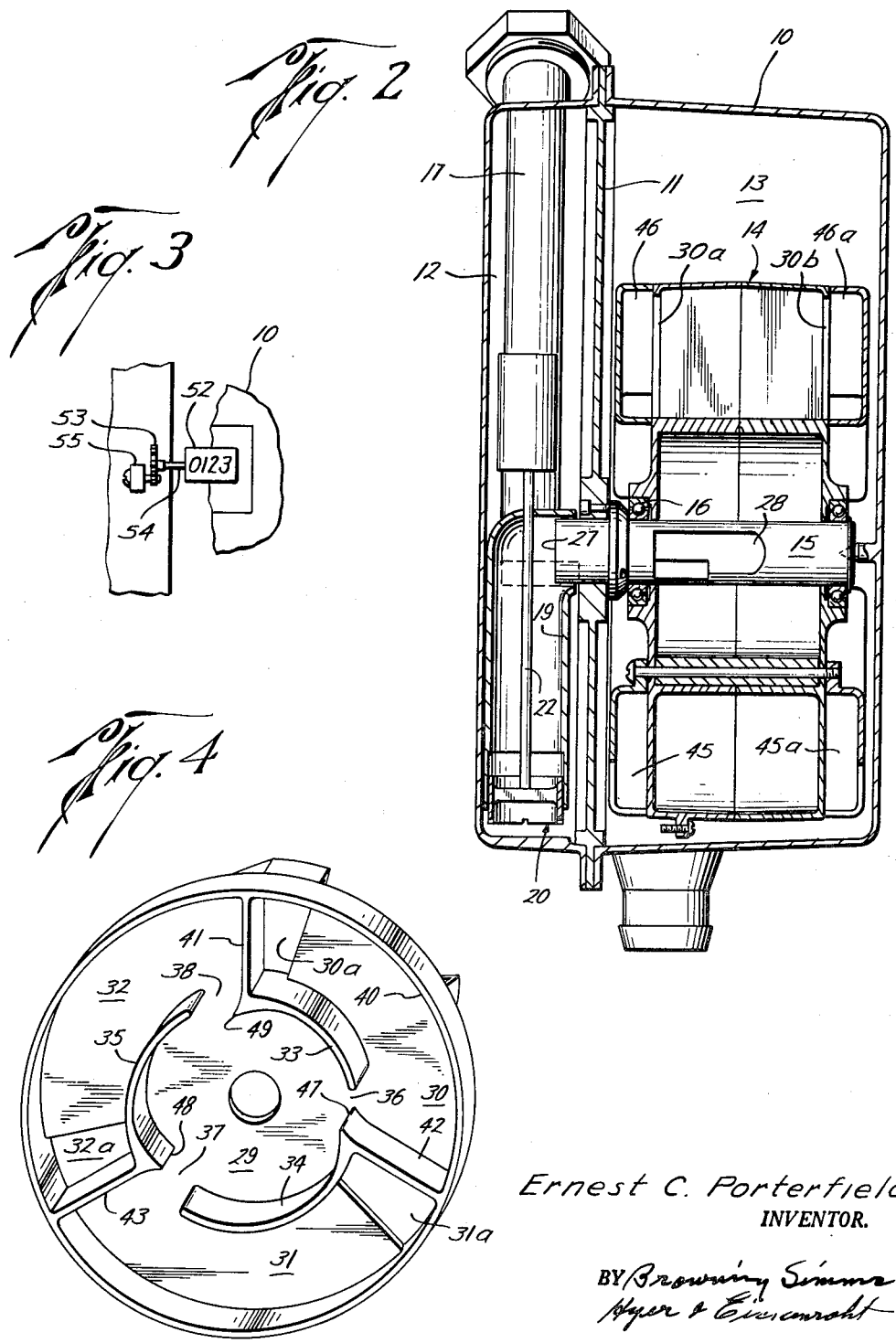

Aug. 17, 1965   E. C. PORTERFIELD   3,200,643
DRUM TYPE METER
Filed July 17, 1961   4 Sheets-Sheet 3
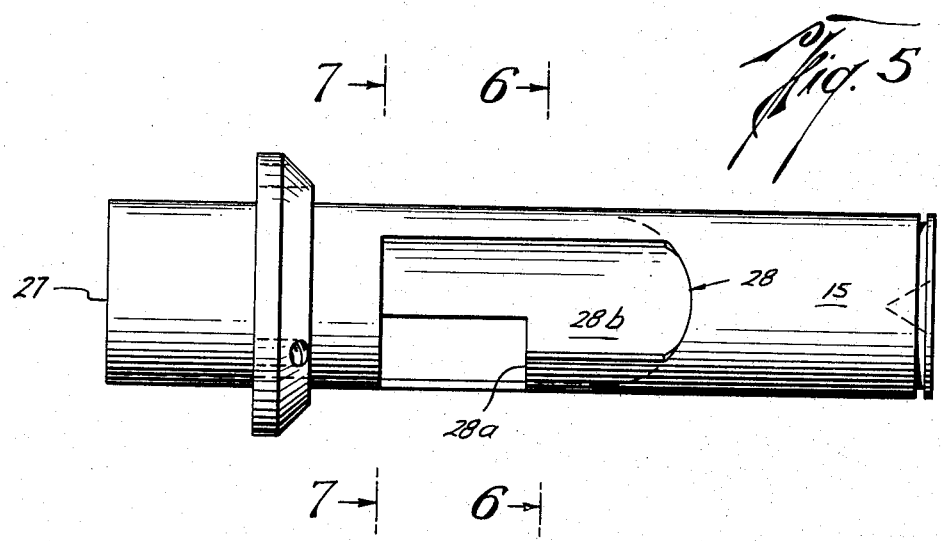
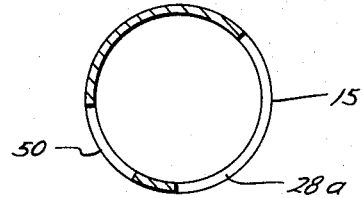
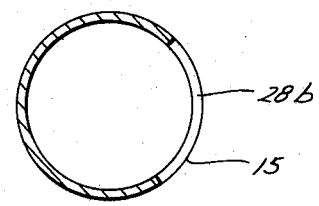
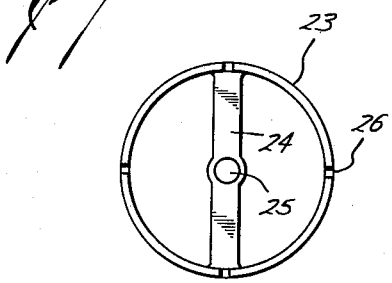
Ernest C. Porterfield
INVENTOR.
BY Browning, Simms,
Myers & Eisenrodt
ATTORNEYS

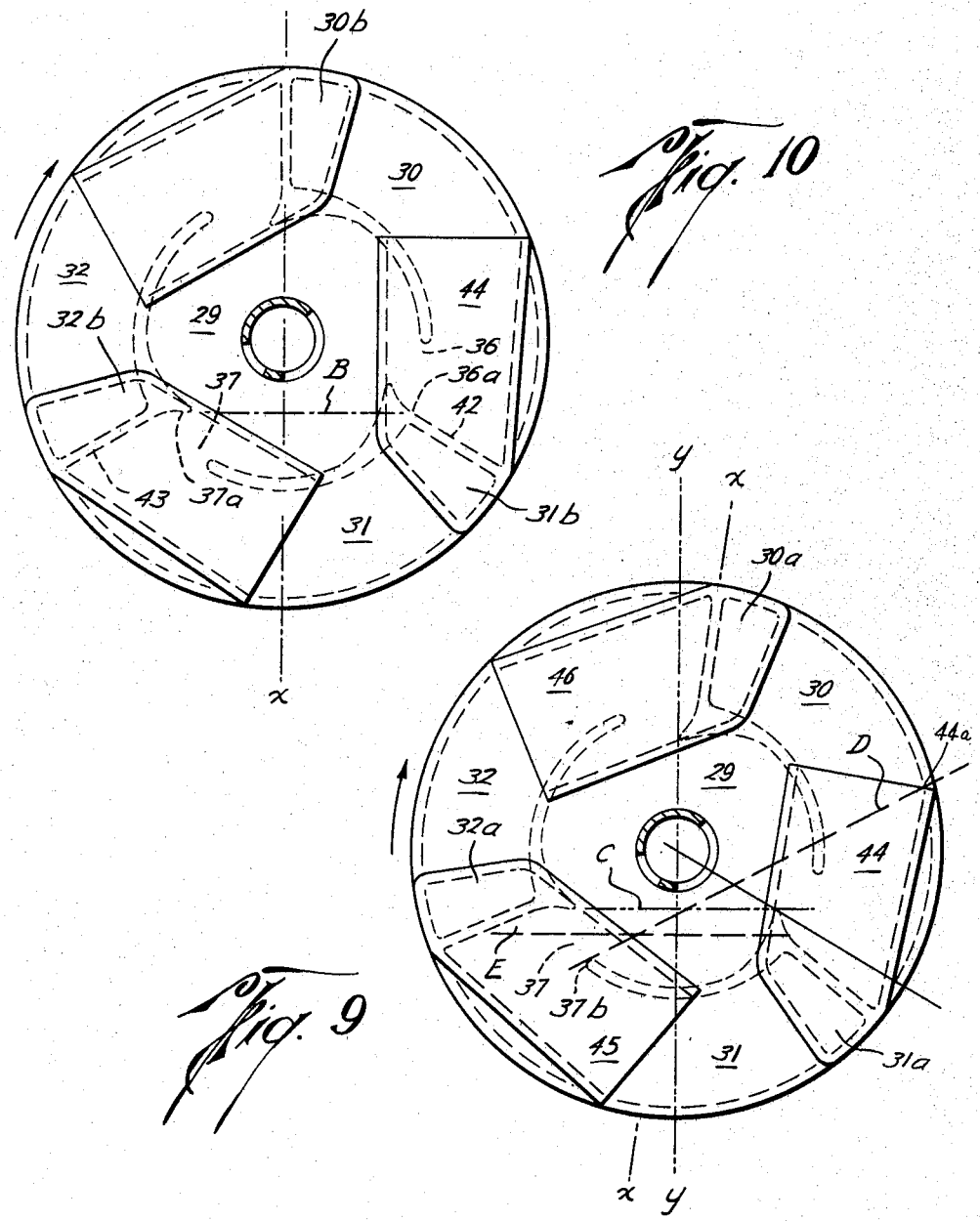

United States Patent Office 3,200,643
Patented Aug. 17, 1965

3,200,643
DRUM TYPE METER
Ernest C. Porterfield, 3801 N. 21-A St., Waco, Tex.
Filed July 17, 1961, Ser. No. 124,682
7 Claims. (Cl. 73—200)

This invention relates to improved meters of the revolving drum type for metering liquid, especially to such meters sufficiently compact to be mountable on a vehicle and yet which accurately meter fuel over a wide range of flow rates. In one aspect it relates to improvements in meters of this type which prevent inaccuracies due to foam in the liquid measured. It is particularly directed to improvements in meters of the type shown in the copending application of Robinson W. Brown and William E. Oakey, Serial No. 820,390, filed June 15, 1959, now U.S. Patent No. 3,056,294.

Meters of revolving drum type are old and well known in the art. Generally, these meters include a drum which is divided into a plurality of metering compartments. Successive compartments are alternately filled and emptied as the drum rotates; and since the capacity of each compartment is known, the determination of the quantity of liquid passing through the meter is easily accomplished by counting the number of revolutions of the drum. Earlier meters of this type have each had one or more of a number of disadvantages. For example, many meters must be quite large if they are to measure accurately at a relatively high flow rate. Another disadvantage is that some meters of this class have been relatively complex in structure and not susceptible to mass production in an economical manner. Others have displayed the desired accuracy only when the liquid being metered flows at substantially constant rate or fluctuates in flow over a very narrow range.

The above disadvantages have been corrected in a meter developed by Brown and Oakey, especially designed for use on trucks or other vehicles to determine the amount of fuel actually placed in the fuel tanks. It has long been desirable to meter fuel dispensed to trucks and similar vehicles to provide corroboration of the charges received by trucking concerns from service stations where the drivers have purchased fuel. Situations have been known to exist wherein the trucking concern was billed for larger amounts of fuel than were actually placed in truck tanks with the value of the difference in amount being retained by the service station operator, the truck driver, or both. In fact, this practice has become so widespread that trucking concerns are being overcharged many millions of dollars each year for fuel that they do not receive.

Meters have been developed which can be placed on a truck to accurately meter the amount of fuel flowing into the tanks. Meters of this type are compact and accurate over a relatively wide range of flow and are not susceptible of being tampered with so as to be made to over-register except where a considerable part of the fuel passed to the measuring compartments is caused to take the form of foam. Accordingly, it is a principal object of the present invention to provide an improvement in meters as described in the co-pending application of Brown and Oakey, identified above, which is not susceptible to inaccuracies caused by foam in the liquid measured.

Another object is to provide a drum meter of this type which has high accuracy over a wide range of flow rates, is relatively simple in design, and is very compact.

Another object is to provide a meter of this type which is constructed so that any tendency toward inaccurate meering due to high rate of flow through the meter is compensated for in such manner that the accuracy of the meter remains within acceptable limits at both high and low rates of flow.

Another object is to provide a meter of this type having few moving parts and which is rugged and of such compact design that it can be mounted on vehicles to meter the fuel flowing into the fuel tanks.

Still another object of this invention is to provide a meter of this type which cannot be caused to over-register by creating large volumes of foam in the liquid fuel and one which cannot be tampered with so as to cause it to over-register.

Other objects, advantages and features of this invention will be apparent to those skilled in the art upon consideration of the specification, claims and the attached drawings.

In the attached drawings, wherein like characters are used throughout to designate like parts:

FIG. 2 is a vertical section through the device of FIG. 1 on the line 2—2;

FIG. 3 is a detail illustrating a counter of preferred type;

FIG. 4 is an isometric view of one half of the metering drum showing the internal construction thereof, it being understood that the other half is a mirror image of the half shown;

FIG. 5 is a detail of an improved shaft for the drum meter illustrating a passageway for fluid through the shaft from an end thereof to two openings in sides of the shaft;

FIG. 6 is a vertical section through the shaft of FIG. 5 on the line 6—6;

FIG. 7 is a vertical section through the shaft of FIG. 5 on the line 7—7;

FIG. 8 is a plan of a valve controlling flow of fluid to be metered into the drum; and FIGS. 9 and 10 are views illustrating the operation of the metering drum.

Figure 1:
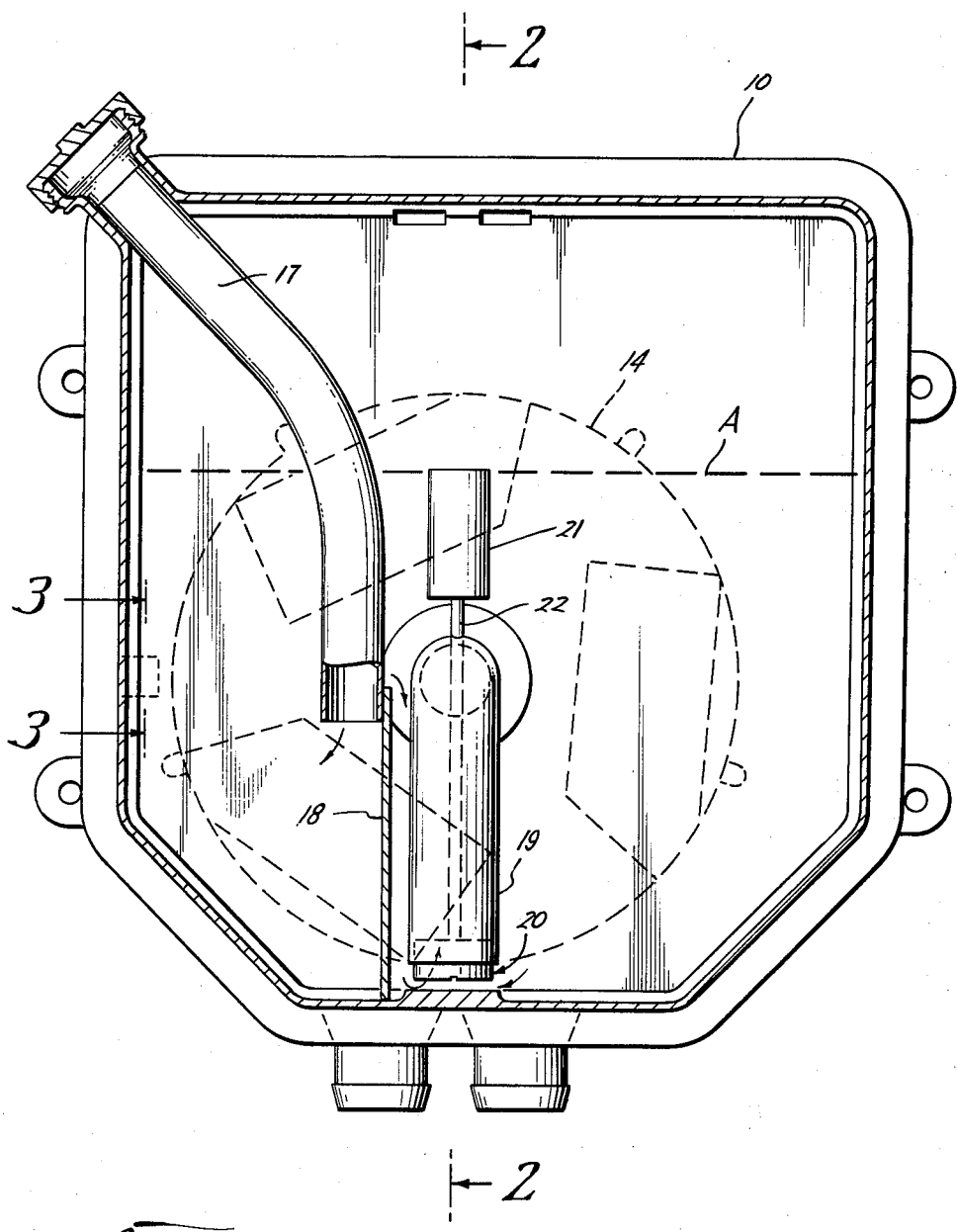
FIG. 1 is a vertical section through a filling chamber disposed at a side of a metering drum illustrating the relationship of the filling chamber and drum meter proper.

The preferred meter illustrated includes a housing 10, shown only in FIGS. 1 and 2, which preferably is of welded construction to prevent tampering with the meter. A fluid-tight partition 11 divides housing 10 into two sections; namely, a preliminary chamber 12 and a section 13 in which a metering drum indicated generally as 14 is disposed and is mounted for rotation about a stationary shaft 15. The mounting is illustrated in FIG. 2 as including friction reducing bearings, preferably ball bearings 16, journaled upon shaft 15.

The liquid to be metered is introduced by an inlet line 17 which extends through housing 10 into a lower part of the preliminary chamber 12. Inlet line 17 is offset from the center of drum 14 and is arranged to discharge liquid downward toward the bottom of chamber 12. A baffle 18 is disposed in contact with the bottom of chamber 12 and opposite sides of the chamber formed by housing 10 and partition 11 to insure that there can be no direct flow from the lower end of inlet line 17 into a lower end of a drum inlet line 19. In FIG. 1 it will be seen that flow of fuel introduced through line 17 must be reversed and pass upward over baffle 18 in order to enter that part of chamber 12 lying to the right of the baffle in the drawings.

This reversal of flo wis effective to cause all bubbles of foam to rise in the liquid maintained in chamber 12 to a level above that of the top of baffle 18; and since the cross sectional area of chamber 12 to the right of the baffle is relatively large as compared to the cross section of inlet line 17, the flow of liquid downward in this large section of the chamber is not rapid enough to submerge bubbles of foam sufficiently that they may enter at the bottom of drum inlet line 19. The drum inlet line 19, a sleeve valve 20, a float 21, and a connecting rod 22, disposed to connect the float and valve, form a preferred means responsive to specific gravity of liquid liquid in the chamber for discharging foam-free liquid from the lower part of the chamber through a passageway in the central shaft of the drum into a central compartment in the drum.

The preferred type valve has the configuration shown in FIG. 8 and comprises a sleeve 23 which has a sliding fit on the interior of drum inlet line 19 and a crossbar 24 having a socket 25 for attachment to the lower end of connecting rod 22. The wall 23 has one or more notches 26 in its lower face to permit a slow seepage of liquid from chamber 12 into drum inlet line 19 when the valve is closed and thus to permit equalization of fluid level in chamber 12 and the central chamber of the drum.

The float 21 has a weight : size ratio such that it floats with its upper end just above liquid level A in chamber 12. With a float of this type, the presence of a minor proportion of bubbles in liquid in which the float is supported will cause the float to sink and close valve 20. Thus, with valve 20 closed, continued introduction of foam through the inlet line 17 will cause gas pressure to build up in chamber 12; and the level of liquid therein will be lowered so that there is a tendency for gas to be vented up through the line 17. In other words, introduction of foamy liquid is quickly halted automatically; and the foam introduced is not passed to the meter proper.

The drum inlet line 19 extends upward to communicate with a passageway for liquid through the central shaft 15. This shaft is hollow for at least a greater portion of its length and is open at end 27 and has a side opening 28 therein, to be discussed in detail later.

The metering drum comprises a cylindrical drum having partitions therein dividing its interior into a central liquid-receiving chamber 29 and a plurality of metering compartments 30, 31 and 32 disposed about inner chamber 29. It will be seen that the central chamber is defined by a plurality of segments 33, 34 and 35 which are separated by openings 36, 37 and 38 to provide for flow from the central chamber into the respective metering compartments. In other words, the central chamber is defined by an inner partition, preferably cylindrical in form, having openings 36, 37 and 38 therein. The metering compartments are defined in part by the drum shell 40, the inner cylindrical partition and cross partitions 41, 42 and 43.

The arrangement is such that the metering compartments are equal in volume, and preferably the compartments themselves are substantially volumetrically symmetrical. That is, when a compartment is filled with liquid, the others being empty, the drum will occupy a position such that the filled compartment has an equal volume of liquid lying to either side of the vertical plane X drawn through the rotational axis of the drum as shown in FIG. 10. This balanced position can be termed the dead center position for the metering compartment per se.

In this position, liquid discharged into inner chamber 29 has risen to at least the line B which is at right angles to vertical plane X. In the structure shown, the vertical plane X bisects the angle between partitions 42 and 43; and for every increment of volume to the left of plane X tending to cause the drum to turn counterclockwise, there is an equal volume increment to the right counter-balancing the turning effect of the increment on the left of plane X. When compartment 31 is at its dead center position, the leading edge 37a of opening 37 is on the same horizontal level as the leading edge 36a of opening 36 into the next succeeding empty compartment 30. The other compartments will pass through similar dead center positions as the drum rotates. It is to be understood that, in the above discussion of the dead center position of the compartments, only the drum-turning effect of liquid in the compartment itself is considered.

Conduit means are provided for discharging liquid from the filled metering compartment into the section 13 within housing 10 responsive to rotation of the drum. Such conduit means are arranged so that, at relatively low flow rates (half the maximum metering capacity or less), the discharge of liquid from the filled compartment does not begin until the trailing edge of the fill opening into that compartment rises above the level of liquid in the inner chamber 29. For example, when the liquid level in chamber 29 is at the line C or below (FIG. 9), the discharge conduit for compartment 31 will not begin to discharge liquid until the trailing edge 37b of opening 37 rises above the level of liquid in chamber 29.

A pair of discharge conduits is provided for each compartment, the conduits of each pair being mounted on opposite sides of the drum. As shown, the conduits comprise cups 44, 45 and 46 and corresponding cups 44a, 45a and 46a arranged in pairs on opposite sides of each metering compartment and arranged to discharge liquid to the exterior of the drum. These cups preferably are made as separate pieces and are then bolted or otherwise fastened to the sides of the drum. The cups communicate with the trailing ends of their respective metering compartment by discharge openings 30a, 31a and 32a and corresponding discharge openings on the opposite sides of the drum, as indicated at 30b in FIG. 2. In preferred form the cups extend along the side of the drum to a point such that a line D (FIG. 9) drawn from their discharge ends as indicated at 44a to the trailing edge of the opening into the respective metering compartment of the cup is substantially the same radial distance from the drum axis as is line C. Hence, at relatively low flow rates, the discharge ends of the cups are positioned to prevent flow therefrom until the trailing edges of the various fill openings into the respective metering compartments have risen above the liquid level in inner chamber 29.

It is to be noted that the various openings 30a, 31a and 32a are flush with the surface of the respective inner partition segments 33, 34 and 35 and with the leading faces of cross partitions 41, 42 and 43. Because of this arrangement, gas or vapor cannot be trapped in the metering compartments; but any gas entering will be dischaged through the cups so that the metering compartments can be completely filled with liquid. Construction of the cups and openings in this manner eliminates the need for any special venting means which would complicate the structure. Also, by use of the cups arranged as described, a very compact, relatively simple structure is provided and yet one which has a large flow capacity such that the meter is capable of handling very high rates of liquid flow therethrough.

With the structure just described, it will be seen that, in addition to the volume of liquid in each metering compartment, an additional volume of liquid will flow into the cups as the metering compartment is filled. For example, if the drum were held so that it could not rotate, the level in cup 44 of FIG. 10 at the time metering compartment 31 is completely filled would be at the line B. The added increment of volume in the cups corresponding to the filled compartment causes the drum to turn to a new position of balance such as the plane Y shown only in FIG. 9.

In order to prevent premature rotation of the drum causing the next succeeding compartment 30 to begin filling before compartment 31 has been completely filled, dams 47, 48 and 49 are provided to extend inward into the central chamber and are situated adjacent the leading edge of each fill opening 36, 37 and 38. These dams are of such height that the liquid in compartment 29 must rise to the level C of FIG. 9 before it can spill over into the next succeeding compartment. Were it not for these dams, liquid in chamber 29 would rise only to level B of FIG. 10 before it would begin spilling over into succeeding compartment 30 and therefore there would be a triangular volume indicated as E in FIG. 9 in compartment 31 which would not be filled. However, because of the dams, the compartments are completely filled. It will be seen that, when a metering compartment is filled with liquid and the liquid has partially filled the associated discharge cups to the same level and has thus caused the drum to move to its balance axis Y, the lip of the dam is on the same level as the leading edge of the opening into the metering compartment being filled.

The arrangement of the dams is such that, while a dam impedes flow into the next succeeding empty compartment until the preceding compartment is filled, it does not substantially impede the flow into the compartment being filled. This is due to the fact that the dam extends inward into the inner chamber. As a result, liquid is prevented from prematurely spilling into the next empty compartment; and yet a relatively large, unrestricted opening is provided into the compartment being filled. This lack of restriction to filling is important in order to handle high rates of flow of the liquid being metered. In the particular meter illustrated, the total cross sectional area of all openings into the meter compartment makes up about 25 percent of the total circumferential area of the inner annulus defining the inner chamber. That is, each of the compartments occupies about a 120° sector, and the opening into this compartment occupies a 30° sector.

The leading faces of the dams are formed so that the dams provide only a minimum impedance to turning the drum. Thus, these faces extend in a curve from the lip of the dam inward smoothly with the inner partition at a substantial distance from the lip of the dam. The trailing face of the dam of course drops rather abruptly from the lip in order to eliminate any impedance to liquid flow to the compartment being filled.

An important feature which contributes to the accuracy of the meter at varying rates of input is the location and shape of the discharge orifice 28, best shown in FIG. 5. At relatively low rates of flow, the liquid level in the inner chamber will gradually rise as a metering compartment is filled and will then fall when the drum turns to place the next succeeding compartment in filling position.

However, during high rates of input flow, the liquid level tends to remain at a constantly high level which, in some cases, may be as high as the orifice 28 in the side of the central shaft. If, under these conditions, liquid is indiscriminately discharged into chamber 29 at high rate of input, the liquid level will become so high as to cause additional liquid to flow into a compartment after it has been filled and while liquid is being dumped from the discharge cup connected with the compartment thus making the meter inaccurate. In other words, there will be flow into a compartment until it is full, and the flow will continue into the same compartment during at least a part of its dumping cycle. As a result, the amount of liquid dumped from each compartment will be greater at high input flow rates than the amount dumped during low input flow rates.

The position and shape of the orifices 28 and 50, best shown in FIGS. 5, 6 and 7, prevent this type operation. Orifice 28 is elongate and has two sections of different width; namely, 28b and 28a. It is preferred that the top of orifice 28 be located about 45° from the top center of shaft 15 throughout its length. Section 28b, which is a bit more than half the total length of orifice 28, preferably has an arcuate extent of about 100°, thus having its bottom edge about 35° above the bottom center of shaft 15. The orifice is then enlarged in section 28a to an arcuate extent of about 135°, thus extending to the center of the bottom of the shaft. An orifice 50 on the opposite side of the shaft has a length substantially identical to that of section 28a and preferably has an arcuate extent of about 55°.

At low rates of throughput, liquid introduced into the open end of shaft 15 from drum inlet line 19 flows out into the central compartment 29 by openings 50 and section 28a of orifice 28. As the rate of throughput increases, the level of liquid in the shaft also tends to increase. At moderately high rates of flow, liquid will be directed downward in the central compartment but at an acute angle to the vertical toward the dam adjacent the opening of the next compartment to be filled by orifice 28. This causes some of the liquid in the inner chamber to spill over the dam into the succeeding empty compartment prior to completion of filling of the preceding compartment. Presence of additional liquid in this drum causes the drum to turn so that the compartment being filled starts to dump before it is closed. However, due to the high liquid level, enough additional liquid flows into the filling compartment during the initial part of the dumping cycle so that the total amount of liquid dumped is equal to the normal metering volume of the compartment.

As the rate of flow increases, the level of liquid in the shaft 15 becomes higher and a correspondingly larger proportion of the liquid is discharged through the orifice portion 28b. This portion is directed almost horizontally; that is, only 10° or so downward from the horizontal; and discharge of liquid in this direction increases the degree of filling of the next succeeding empty compartment before the compartment normally filling at low rates of flow is completely full. At this point, another function of the orifice 50 comes into play. This orifice performs the function of reducing pressure on the stream issuing from section 28b of orifice 28 and thus prevents a jetting effect. The above dimensions of the orifice in degrees have been found to be exceptionally effective in increasing the accuracy of a three-compartment meter such as is shown in the drawings.

The principal orifice 28 is shaped as a long slot with its major dimension paralleling the axis of drum rotation. Its size and shape are such that, when the liquid input flow rate is about one half the meter capacity, the orifice begins directing some liquid into the succeeding compartment while the preceding compartment is still filling; and, as the input flow rate to the meter is further increased, there is a continual increase in the quantity of liquid directed into the succeeding compartment to speed up the rotation of the drum to such degree that the amount of liquid flowing into the filling compartment while the latter is dumping is substantially equal to the amount of liquid that would have been required to fill the compartment completely.

It should be noted that the above angular placement of the discharge orifice does not change the liquid level in the inner chamber so as to prevent flow into a metering compartment after it has been filled; but it does compensate for the high liquid level and its overfilling by proportionately speeding up the drum. It has been found that, with an orifice of the dimensions described, the three-compartment meter illustrated in the drawings has an overall inaccuracy in measurement of less than ±.5 percent. These results have been attained in meters of this type installed on highway trucks, and the present shape and size of the orifice together with the dampening effect of the consistently high liquid level maintained in the preliminary chamber 12 have resulted in a degree of accuracy in such meters which is greater than the accuracy of many dispensing pump meters installed in service stations. As a result, the quantity of fuel metered into the truck tanks by the present meters has been found to check quite closely with actual billings for fuel received by trucking companies.

The overall quantity of fuel measured by a meter of this type is recorded by a conventional counter shown in FIG. 3. Since the number of drum rotations is directly proportional to the volume of liquid measured, a simple counter arranged to count the number of rotations of the drum gives a reading which is proportional to the total volume of liquid passed through the meter.

A conventional counter 52 is carried by housing 10 and has a suitable star wheel 53 attached to its input shaft 54. A plurality of recorder tripping devices 55, illustrated as lugs on the outer surface of drum shell 40, are arranged to turn star wheel 53 through an arc corresponding to a distance between teeth thereon each time one of the devices 55 passes the star wheel. Thus, as the drum turns, each of the lugs will in turn engage a tooth on the star wheel and turn it a fraction of a revolution which is the reciprocal of the number of teeth on the star wheel. In the preferred form, five or a multiple thereof of the recorder actuating means 55 are evenly spaced around the periphery of the drum shell 40. Then, by using a five-toothed star wheel, the register shaft will be turned one revolution for each revolution of the drum. The star wheel is removable so that a six-toothed star wheel can be used on the register shaft; and it has been found that this change permits registering Imperial gallons or U.S. gallons as desired. Thus, with this simple change, the meter can be made to read either U.S. gallons or Imperial gallons with an inaccuracy of 0.08 percent insofar as the counting device itself is concerned.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a revolving drum meter comprising a housing, a drum mounted in the housing for rotation about a horizontal axis, an inner partition disposed about said axis and defining a central compartment in the drum, said inner partition having a plurality of fill openings therein, a plurality of cross partitions respectively extending from the inner partition adjacent the leading edge of said fill openings to the circumferential wall of the drum thereby dividing the outer portion of the drum into a plurality of metering compartments each limited by a leading and trailing cross partition, a dam extending inwardly of the inner partition adjacent each of said leading edges of the openings to thereby impede flow into an empty succeeding metering compartment until a preceding metering compartment has been substantially filled and, upon rotation of the drum to fill the succeeding compartment becoming substantially ineffective to impede flow into the succeeding compartment, means for discharging liquid into said central compartment, and individual means for discharging liquid from each of the metering compartments upon each of such compartments becoming filled, including a lateral discharge opening in each compartment into a corresponding discharge conduit, said lateral discharge opening being substantially flush with the trailing cross partition and with the inner partition in the compartment, that improvement which comprises a fluid tight vertical partition dividing the housing into a preliminary chamber and a chamber in which the drum is disposed; an inlet line for liquid arranged to discharge liquid into the bottom of the preliminary chamber; a central shaft in the central compartment having a passageway for liquid therethrough communicating with the preliminary chamber and the central compartment; a float in the preliminary chamber; and a valve responsive to movement of said float to control discharge of foam-free liquid from a lower part of the preliminary chamber into the central compartment in the drum.

2. In a revolving drum meter comprising a housing, a drum mounted in the housing for rotation about a horizontal axis, an inner partition disposed about said axis and defining a central compartment in the drum, said inner partition having a plurality of fill openings therein, a plurality of cross partitions respectively extending from the inner partition adjacent the leading edge of said fill openings to the circumferential wall of the drum thereby dividing the outer portion of the drum into a plurality of metering compartments each limited by a leading and a trailing cross partition, a dam extending inwardly of the inner partition adjacent each of said leading edges of the openings to thereby impede flow into an empty succeeding metering compartment until a preceding metering compartment has been substantially filled, and, upon rotation of the drum to fill the succeeding compartment, becoming substantially ineffective to impede flow into the succeeding compartment, means for discharging liquid into said central compartment, and individual means for discharging liquid from each of the metering compartments upon each of such compartments becoming filled, including a lateral discharge opening in each compartment into a corresponding discharge conduit, said lateral discharge opening being substantially flush with the trailing cross partition and with the inner partition in the compartment, that improvement which comprises a fluid tight vertical partition dividing the housing into a preliminary chamber and a chamber in which the metering drum is disposed; a central shaft in the central compartment having a passageway for liquid therethrough communicating with the preliminary chamber and with the central compartment; an inlet line for liquid arranged to discharge liquid into the bottom of the preliminary chamber at a location offset from said shaft; a float in the preliminary chamber; a tube extending upward from a location near the bottom of the chamber communicating with the passageway in the shaft; and a valve responsive to movement of said float arranged to open and close the bottom of said tube.

3. In a revolving drum meter comprising a housing, a drum mounted in the housing for rotation about a horizontal axis, an inner partition disposed about said axis and defining a central compartment in the drum, said inner partition having a plurality of fill openings therein, a plurality of cross partitions respectively extending from the inner partition adjacent the leading edge of said fill openings to the circumferential wall of the drum thereby dividing the outer portion of the drum into a plurality of metering compartments each limited by a leading and a trailing cross partition, a dam extending inwardly of the inner partition adjacent each of said leading edges of the openings to thereby impede flow into an empty succeeding metering compartment until a preceding metering compartment has been substantially filled and, upon rotation of the drum to fill the succeeding compartment becoming substantially ineffective to impede flow into the succeeding compartment, means for discharging liquid into said central compartment, and individual means for discharging liquid from each of the metering compartments upon each of such compartments becoming filled, including a lateral discharge opening in each compartment into a corresponding discharge conduit, said lateral discharge opening being substantiallyy flush with the trailing cross partition and with the inner partition in the compartment, that improvement which comprises a fluid tight vertical partition dividing that housing into a preliminary chamber and a chamber containing the drum; a central shaft in the central compartment having a passageway for liquid therethrough communicating with the preliminary chamber and with the central compartment; an inlet line for liquid arranged to discharge liquid into the bottom of the preliminary chamber at a location offset from said shaft; a drum inlet tube extending upward from a location near the bottom of the chamber to communicate with the passageway in the shaft; a float in the preliminary chamber; a valve responsive to movement of said float to control discharge of foam-free liquid from a lower part of the preliminary chamber in the central compartment in the drum and a baffle in the preliminary chamber extending upward from the bottom thereof between the inlet line and the drum inlet tube.

4. In a revolving drum meter comprising a housing, a drum mounted in the housing for rotation about a horizontal axis, an inner partition disposed about said axis and defining a central compartment in the drum, said inner partition having a plurality of fill openings therein, a plurality of cross partitions respectively extending from the inner partition adjacent the leading edge of said fill openings to the circumferential wall of the drum thereby dividing the outer portion of the drum into a plurality of metering compartments each limited by a leading and a trailing cross partition, a dam extending inwardly of the inner partition adjacent each of said leading edges of the openings to thereby impede flow into an empty succeeding metering compartment until a preceding metering compartment has been substantially filled and, upon rotation of the drum to fill the succeeding compartment, becoming substantially ineffective to impede flow into the succeeding compartment, means for discharging liquid into said central compartment, and individual means for discharging liquid from each of the metering compartments upon each of such compartments becoming filled, including a lateral discharge opening in each compartment into a corresponding discharge conduit, said lateral discharge opening being substantially flush with the trailing cross partition and with the inner partition in the compartment, that improvement which comprises a fluid tight vertical partition dividing the housing into a preliminary chamber and a chamber containing the drum; an inlet line for liquid arranged to discharge liquid into the bottom of the preliminary chamber; a central shaft in the central compartment having a passageway for liquid therethrough communicating with the preliminary chamber and with the central compartment, said passageway including an opening in an end of the shaft adjacent the preliminary chamber, a larger opening in the side of the shaft within the central compartment facing the next succeeding compartment to be filled, and a smaller opening in the opposite side of the shaft; an inlet for liquid arranged to discharge into the bottom of the preliminary chamber at a location offset from said shaft; a float in the preliminary chamber; a drum inlet tube in the preliminary chamber extending upward from the bottom thereof and communicating with said opening in the end of the shaft; a float in the preliminary chamber; a valve responsive to movement of said float to control discharge of foam-free liquid from a lower part of the preliminary chamber in the central compartment in the drum; and a baffle extending upward from the bottom of the preliminary chamber in fluid tight engagement with opposite walls thereof locating between said inlet line for liquid and the drum inlet tube.

5. In a revolving drum meter comprising a housing, a drum mounted in the housing for rotation about a horizontal axis, an inner partition disposed about said axis and defining a central compartment in the drum, said inner partition having a plurality of fill openings therein, a plurality of cross partitions respectively extending from the inner partition adjacent the leading edge of said fill openings to the circumferential wall of the drum thereby dividing the outer portion of the drum into a plurality of metering compartments each limited by a leading and a trailing cross partition, a dam extending inwardly of the inner partition adjacent each of said leading edges of the openings to thereby impede flow into an empty succeeding metering compartment until a preceding metering compartment has been substantially filled and, upon rotation of the drum to fill the succeeding compartment, becoming substantially ineffective to impede flow into the succeeding compartment, means for discharging liquid into said central compartment, and individual means for discharging liquid from each of the metering compartments upon each of such compartments becoming filled, including a lateral discharge opening in each compartment into a corresponding discharge conduit, said lateral discharge opening being substantially flush with the trailing cross partition and with the inner partition in the compartment, that improvement which comprises a fluid tight vertical partition dividing the housing into a preliminary chamber and a chamber containing the drum; a central shaft in the central compartment having a passageway for liquid therethrough communicating with the preliminary chamber and with the central compartment, said passageway including an opening in the end of the shaft communicating with a central bore therein, a larger opening in the side of said shaft in the central compartment facing the next succeeding compartment to be filled, said larger opening being an elongate opening substantially parallel with the axis of the shaft having an arcuate extent of about 100° on the circumference of the shaft for more than half its length and about 135° for the remainder of its length, and a smaller opening on the opposite of the shaft within the central compartment having an arcuate extent of about 55° on the circumference of the shaft and length substantially the same as that of the large opening having arcuate width of 135°; an inlet line for liquid arranged to discharge liquid into the bottom of the preliminary chamber; a float in the preliminary chamber; a drum inlet line extending upward from a location adjacent the bottom of the preliminary chamber communicating with the opening in the end of the shaft; a valve responsive to movement of said float to control discharge of foam-free liquid from a lower part of a preliminary chamber into the central compartment in the drum.

6. The meter of claim 5 wherein the valve is a sleeve valve adjacent the bottom of the drum inlet tube arranged to control flow of liquid thereinto.

7. The meter of claim 5 in which the float has a weight: size ratio to cause it to float in almost submerged condition in foam-free liquid to be metered.

References Cited by the Examiner
UNITED STATES PATENTS

| | | | |
|---|---|---|---|
| 1,455,757 | 5/23 | Barnes | 73—217 |
| 1,622,715 | 3/27 | Hawxhurst | 73—200 |
| 1,970,843 | 8/34 | Curtis. | |
| 2,124,681 | 7/38 | Jauch et al. | 73—200 X |
| 2,411,261 | 11/46 | Granberg | 73—200 |
| 2,697,943 | 12/54 | Pressler | 73—200 |
| 3,005,343 | 10/61 | Brown et al. | 73—217 |
| 3,056,294 | 10/62 | Brown et al. | 73—217 X |

RICHARD C. QUEISSER, *Primary Examiner.*

DAVID SCHONBERG, *Examiner.*